United States Patent
Parro et al.

(10) Patent No.: US 7,124,605 B2
(45) Date of Patent: Oct. 24, 2006

(54) MEMBRANE/DISTILLATION METHOD AND SYSTEM FOR EXTRACTING CO2 FROM HYDROCARBON GAS

(75) Inventors: David Parro, Houston, TX (US); Edgar S. Sanders, Jr., Houston, TX (US)

(73) Assignee: National Tank Company, Houston, TX (US)

( * ) Notice: Subject to any disclaimer, the term of this patent is extended or adjusted under 35 U.S.C. 154(b) by 442 days.

(21) Appl. No.: 10/697,380

(22) Filed: Oct. 30, 2003

(65) Prior Publication Data

US 2005/0092594 A1    May 5, 2005

(51) Int. Cl.
*F25J 3/00* (2006.01)
(52) U.S. Cl. .......................... 62/624; 62/929
(58) Field of Classification Search ................ 62/624, 62/929, 620
See application file for complete search history.

(56) References Cited

U.S. PATENT DOCUMENTS

| | | | |
|---|---|---|---|
| 4,374,657 A | 2/1983 | Schendel et al. | |
| 4,417,449 A | 11/1983 | Hegarty et al. | ............. 62/78 |
| 4,444,571 A | 4/1984 | Matson | |
| 4,511,382 A * | 4/1985 | Valencia et al. | ............. 62/621 |
| 4,602,477 A | 7/1986 | Lucadamo | ............. 62/24 |
| 4,639,257 A | 1/1987 | Duckett et al. | |
| 4,681,612 A | 7/1987 | O'Brien et al. | |
| 4,936,887 A | 6/1990 | Waldo et al. | |
| 4,990,168 A * | 2/1991 | Sauer et al. | ............. 62/624 |
| 5,131,928 A | 7/1992 | Blachman et al. | |
| 6,085,549 A * | 7/2000 | Daus et al. | ............. 62/624 |
| 2004/0099138 A1* | 5/2004 | Karode et al. | ............. 95/214 |
| 2004/0182786 A1* | 9/2004 | Colling et al. | ............. 210/640 |

FOREIGN PATENT DOCUMENTS

CA     1253430     5/1984     ............. 162/113

OTHER PUBLICATIONS

Schendel, Ronald; "Process can efficiently treat gase assocated with CO2 miscible flood", Oil and Gas Journal, Jul. 1983.*

* cited by examiner

Primary Examiner—William C. Doerrler
(74) Attorney, Agent, or Firm—Gable Gotwals

(57) ABSTRACT

A method of separating $CO_2$ from a hydrocarbon gas inlet stream that is within predetermined pressure and temperature ranges, including the steps of subjecting the inlet stream to fractional distillation providing a $CO_2$ bottom product stream and a distillation overhead stream, passing the distillation overhead stream to the inlet of a primary reflux drum producing a primary reflux liquid stream and a hydrocarbon vapor stream, subjecting the hydrocarbon vapor stream to membrane separation to provide a hydrocarbon product stream and a permeate stream, compressing the permeate stream and recycling the compressed permeate stream to the inlet of the primary reflux drum thereby providing a $CO_2$ liquid product and a hydrocarbon gas product.

17 Claims, 2 Drawing Sheets

MEMBRANE/DISTILLATION METHOD AND SYSTEM FOR EXTRACTING CO2 FROM HYDROCARBON GAS

REFERENCE TO PENDING APPLICATIONS

This application is not based upon any pending domestic or international patent application.

REFERENCE TO MICROFICHE APPENDIX

This application is not referenced in any microfiche appendix.

FIELD OF THE INVENTION

The present invention relates to a method and system for treating a hydrocarbon mixture to remove $CO_2$ along with attendant sulfur compounds using distillation and membrane separation systems with critically arranged distillation reflux paths.

BACKGROUND OF THE INVENTION

Much of the world's natural gas supply is contaminated with unacceptably high levels of carbon dioxide ($CO_2$). In some cases, in addition to excessive $CO_2$, the natural gas may also contain excessive levels of sulfur compounds. Such sulfur compounds include hydrogen sulfide and carbonyl sulfide. In many cases, the carbon dioxide and sulfur contaminants lower the BTU value of natural gas making such gas unsuitable for use as a fuel or unsuitable to be transported in a pipeline carrier. Various commercial technologies including low temperature distillation, amine scrubbing and membrane separation, have been developed to upgrade natural gas containing excessive $CO_2$ or sulfur compounds. All of the above-mentioned technologies typically produce a useable natural gas stream and a carbon dioxide/sulfur compound stream. The distillation separation of $CO_2$ from hydrocarbon gas is a very energy and capital-intensive process. The present invention is an improvement on distillation technology that reduces the energy and capital requirement, producing a hydrocarbon product more efficiently.

Background information relating to the extraction of $CO_2$, with or without accompanying sulfur compounds, from hydrocarbon gas may be found in the following publications:

(1) *Process Can Efficiently Treat Gases Associated With $CO_2$ Miscible Flood—Oil & Gas Journal*, Jul. 18, 1983.

(2) U.S. Pat. No. 4,936,887—Distillation Plus Membrane Processing of Gas Streams, Waldo et al., Jun. 26, 1990.

(3) Canadian Patent No. 1,253,430—Process and Apparatus for Fractionation of a Gaseous Mixture, Burr, May 2, 1989.

(4) U.S. Pat. No. 4,417,449—Process for Separating Carbon Dioxide and Acid Gases From a Carbonaceous Off-Gas, Hagarty et al., Nov. 29, 1983.

(5) U.S. Pat. No. 4,602,477—Membrane-Aided Distillation for Carbon Dioxide and Hydrocarbon Separation, Lucadamo, Jul. 29, 1986.

(6) U.S. Pat. No. 4,444,571—Energy Efficient Process for the Stripping of Gases from Liquids, Matson, Apr. 24, 1984.

(7) U.S. Pat. No. 4,374,657—Process of Separating Acid Gases from Hydrocarbons, Feb. 22, 1983.

SUMMARY OF THE INVENTION

The present invention relates to a membrane/distillation system for producing a $CO_2$ product, or a sour $CO_2$ product and a hydrocarbon product. The system is comprised of: (a) ancillary equipment for dehydrating, cooling, and temperature conditioning the inlet gas; (b) a distillation system for separating the conditioned inlet gas into a $CO_2$ liquid stream and a distillation overhead stream; (c) a primary condenser and reflux drum for separating the distillation overhead into a primary reflux stream and a hydrocarbon vapor stream, (d) a membrane system for separating the vapor stream into a hydrocarbon product and a permeate stream that is compressed, cooled and condensed to form additional reflux for the distillation column. The inlet hydrocarbon stream may be a natural gas stream or associated gas stream and may have liquid hydrocarbon components and which contains carbon dioxide and/or sulfur compounds. The hydrocarbon product may be a stream consisting predominantly of light hydrocarbons. The hydrocarbon product may include insignificant amounts of $CO_2$, sulfur containing species and other components. The $CO_2$ product may include insignificant amounts of hydrocarbon and other components, or the $CO_2$ product may be pure $CO_2$.

In one embodiment of the invention, the inlet gas stream is preconditioned for the separation by ancillary equipment. If required, inlet temperature, and pressure of the dehydrated hydrocarbon mixture are adjusted. After conditioning, the conditioned inlet stream is subjected to distillation. The distillation column produces an overhead stream and a $CO_2$ bottom product. The distillation overhead is further processed by a primary reflux system. The primary reflux system partially condenses the stream in a condenser. The partially condensed stream is separated by the primary reflux drum into a liquid reflux and hydrocarbon overhead. The liquid reflux is returned to the column. The hydrocarbon-enriched overhead vapor from the primary reflux drum is further separated by the membrane system. The membrane system separates the reflux drum vapor into a hydrocarbon vapor stream and permeate stream. The permeate stream is compressed to a pressure greater than the distillation overhead. The compressed permeate stream is combined with the distillation overhead. This combined stream (distillation overhead and permeate stream) comprises the primary condenser inlet stream. This combined condenser inlet is fed to the primary reflux system which ultimately provides liquid reflux and membrane feed as described above.

In a separate embodiment of the invention, the inlet hydrocarbon fluid mixture is initially preconditioned and separated by the distillation system. If required, the inlet temperature and pressure of the dehydrated hydrocarbon mixture are adjusted. After conditioning, the inlet stream is subjected to fractional distillation. The distillation column produces an overhead stream and a $CO_2$ bottom product. The distillation overhead is further processed by a primary reflux system. The primary reflux system partially condenses the condenser inlet stream in the primary condenser. The partially condensed stream is separated by the primary reflux drum into a liquid reflux and hydrocarbon overhead. The overhead hydrocarbon vapor from the primary reflux drum provides a partial feed to the membrane system. The membrane system separates the membrane inlet stream into a hydrocarbon product and a permeate stream. The permeate stream is compressed to a pressure greater than the primary reflux. The permeate stream is partially condensed in a secondary condenser and a secondary reflux drum is used to separate the two phase fluid. The pressurized liquid from the secondary reflux drum is added to the primary reflux downstream of the primary condenser. The hydrocarbon vapor from the secondary reflux drum is combined with the hydrocarbon vapor stream from the primary reflux drum. This combined stream comprises the membrane inlet stream.

In either of the above embodiments of the invention, the $CO_2$ bottom product from the fractional distillation is processed identically. The stream is partially vaporized in a reboiler heater. A reboiler separator produces a vapor for re-introduction into the column and a $CO_2$ liquid product. A portion of the $CO_2$ liquid product may optionally be used to satisfy the cooling requirements of the process. In this mode of operation, a $CO_2$ gas product is also produced.

The conditioned inlet gas required as feed to this invention may be obtained by a variety of methods well-known to those skilled in the art. The dehydrating system may be a glycol absorption system, a desiccant absorption system or a membrane dehydration system. For purposes of this invention, a dehydrating system is defined as a system that removes water from the stream to a dew point of less than the lowest temperature observed in the system.

A cooling system for the purposes of this invention may be a heat exchange system, a gas expansion system, a turbo expander system, a valve expansion system, or a mechanical refrigeration system. The heat exchange system is defined as one or more heat exchangers which utilize ambient temperature, or temperature of internal process streams, to decrease the temperature of the specified stream. A heat exchange system may consist of aerial-type exchangers, shell and tube, or plate and frame-type exchangers, which transfer heat from one process stream to another. An expansion system, either gas or liquid, is the expansion of a process stream to a condition of lower pressure. A turbo expander system is the expansion of this process stream through a turbo expander. In a turbo expander system, the expansion or pressure reduction of the gas stream is used to generate mechanical energy and effect a cooling of the process stream. A valve expansion system is the expansion or pressure reduction of this process stream through a valve or an orifice. The pressure reduction causes the gas stream to cool. A mechanical refrigeration system is the reduction of a process temperature by use of cooling derived from a refrigeration source that is ancillary to the process streams. In a mechanical refrigeration system, a refrigerant is contained in a closed loop. The refrigerant is subjected to pressurization, expansion and condensation. On expansion, the pressurized refrigerant vaporizes and cools. This cooling is utilized in a cross exchanger to reduce the temperature of the process stream. The heat loss from the cross exchange causes condensation of the refrigerant stream. The condensed refrigerant is again pressurized and the cycle repeated.

A preferred temperature range of the cooling procedure of step (a) is from about −30° F. to about 150° F. and more preferably between −20° F. and 60° F.

The system of the present invention may comprise a depressurizing device for optimizing the properties of inlet streams for separation by components of this invention. Distillation and membrane separation are the primary components. Typical depressurizing devices are a compressor, a turbo expander, and an expansion valve. The separation system of the present invention may also comprise a pump and a compressor. The pressure of the pressuring adjusting step (b) is from about 200 psia to about 1200 psia, and preferably from 350 psia to 800 psia and most preferably between 550 and 650 psia.

The distillation system is defined as a separation device that utilizes differences in boiling point and relative volatility to effect separation of components. The distillation system may have a plurality of distillation columns and the columns may be in a series or recycle configuration. Typical distillation columns employ trays and weirs to effect the successive steps of rectification and equilibration required for distillation. The column has a reflux produced by an overhead reflux system (condenser and separator drum) and reboiler vapor produced by a bottom fluid boiler and separator drum.

The membrane system is defined as a system which utilizes a selective barrier that is capable of separating components on the basis of size, shape or solubility. The membrane system separates a high-pressure feed stream into a high-pressure non-permeate stream and a lower pressure permeate stream. Membranes that preferentially permeate $CO_2$ faster than hydrocarbons are useful for this invention. Membranes of this type are typically comprised of a glassy polymer. A glassy polymer is a polymer that is applied at a temperature lower than the glass transition. Examples of polymer families that are typically employed as glassy polymer membranes include: cellulose acetate, polyaramides, polybenzoxazoles, polycarbonates, polyimides, and polysulfones. Structural modification of the base polymer backbone is often used to enhance the gas separation performance of a given polymer family. These structural variants are also useful in this invention.

The membrane system has at least one membrane unit. The membrane system can have a plurality of membrane units. Often, the plurality of membrane units are arranged in a series configuration. The series configuration leads to improved performance when the membrane module performance is less than predictions based on an ideal membrane unit. A recycle configuration of the membrane modules can also be used to reduce hydrocarbon losses.

In one embodiment, the process comprises the step of recovering energy from the stream of $CO_2$ liquid from the bottom of the distillation column. By flashing all or a part of the liquid across an expansion valve, sufficient refrigeration can be achieved to meet or exceed the cooling requirements of the system. Furthermore, this mode of operation eliminates the necessity of ancillary mechanical refrigeration.

In another embodiment, the present invention relates to a process for producing high levels of $CO_2$ liquid and a hydrocarbon product. The process comprises the steps of (a) cooling dehydrated hydrocarbon fluid mixture; (b) adjusting the pressure of the hydrocarbon fluid mixture; (c) distilling the hydrocarbon fluid mixture to produce a $CO_2$ liquid and a hydrocarbon byproduct containing $CO_2$ and/or sour gas; and (d) utilizing a membrane system to further separate the hydrocarbon byproduct to produce a recoverable hydrocarbon product and an additive for distillation column reflux. In this embodiment, mechanical refrigeration is used for the cooling step (c) and, the $CO_2$ liquid from the bottom of the distillation column (c) is collected as product.

DETAILED DESCRIPTION OF THE PREFERRED EMBODIMENTS

Figure 1:
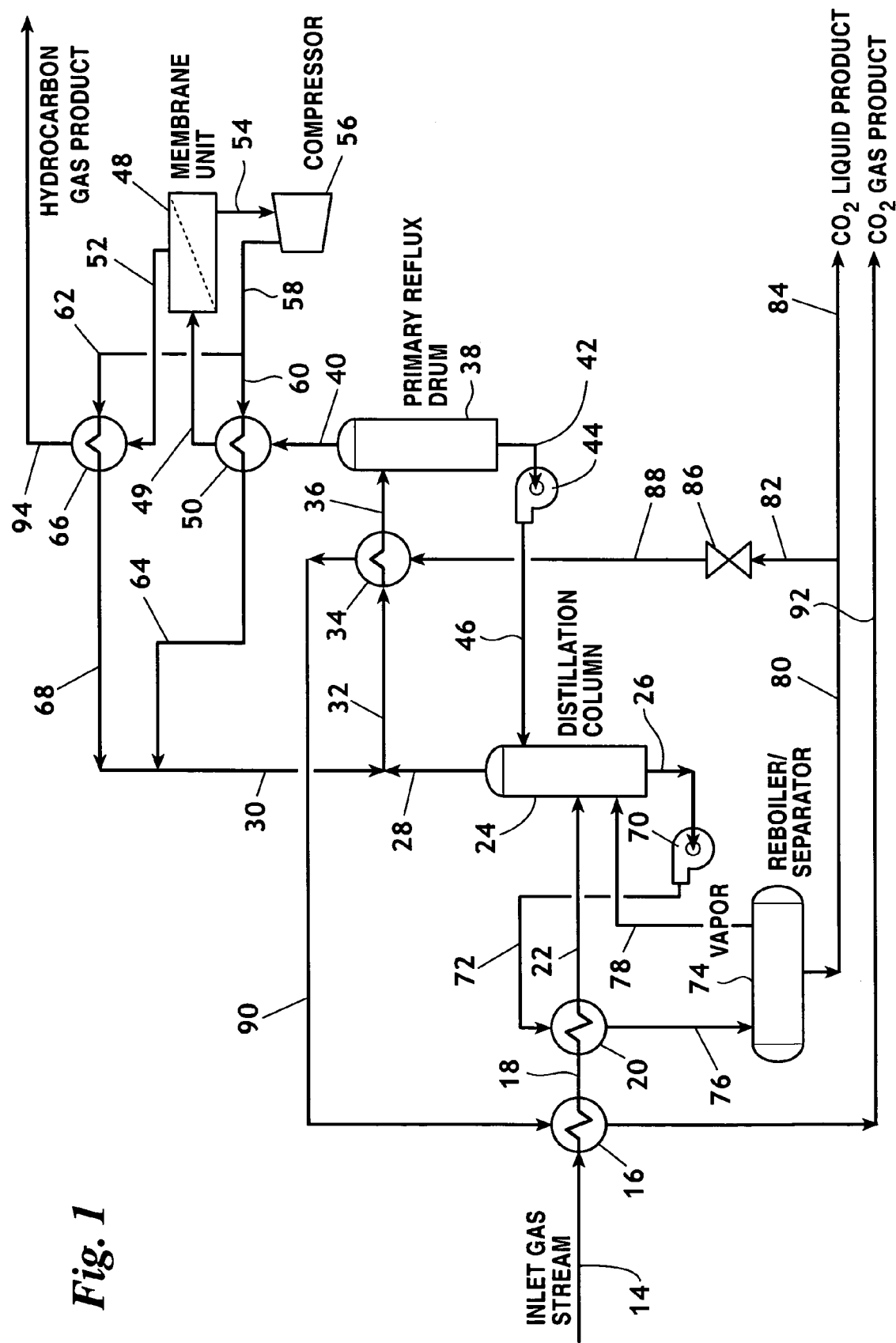
FIG. 1 represents a schematic flow diagram of a preferred embodiment of the present invention.

Major elements of the invention are indicated in the drawings by numerals as follows:

| | |
|---|---|
| 14 | Inlet gas stream |
| 16 | Inlet cross heat exchanger |
| 18 | Cooled inlet stream |
| 20 | Reboiler cross heater |
| 22 | Conditioned inlet stream |
| 24 | Distillation column |
| 26 | $CO_2$ bottom product stream |
| 28 | Distillation overhead stream |
| 30 | Permeate stream |
| 32 | Combined condenser inlet stream |
| 34 | Primary condenser |
| 36 | Primary condenser outlet stream |
| 38 | Primary reflux drum |
| 40 | Hydrocarbon vapor stream |
| 42 | Primary reflux liquid stream |
| 44 | Primary reflux pump |
| 46 | Pumped primary reflux liquid stream |
| 48 | Membrane unit |
| 49 | Membrane inlet |
| 50 | Permeate cross heat exchanger |
| 52 | Hydrocarbon gas product stream |
| 54 | Permeate stream |
| 56 | Compressor |
| 58 | Compressed permeate stream |
| 60 | First permeate cross heat exchanger feed stream |
| 62 | Second permeate cross heat exchanger feed stream |
| 64 | Permeate cross heat exchanger outlet stream |
| 66 | Hydrocarbon product cross heat exchanger |
| 68 | Hydrocarbon product cross heat exchanger outlet stream |
| 70 | $CO_2$ bottom product pump |
| 72 | Pumped $CO_2$ bottom product stream |
| 74 | Reboil/separator |
| 76 | Reboiler separator inlet stream |
| 78 | Reboiler separation vapor stream |
| 80 | Reboiler separation liquid stream |
| 82 | Primary $CO_2$ refrigerant stream |
| 84 | $CO_2$ liquid product |
| 86 | Primary refrigerant pressure reduction device |
| 88 | Primary condenser refrigerant inlet stream |
| 90 | Primary condenser refrigerant outlet stream |
| 92 | $CO_2$ gas product |
| 94 | Hydrocarbon gas product |
| 96 | Secondary reflux drum |
| 98 | Secondary condenser |
| 102 | Secondary condenser outlet stream |
| 104 | Secondary reflux liquid stream |
| 106 | Combined reflux liquid stream |
| 108 | Secondary $CO_2$ refrigerant stream |
| 110 | Secondary refrigerant pressure reduction device |
| 112 | Secondary condenser refrigerant inlet stream |
| 114 | Secondary condenser refrigerant outlet stream |
| 116 | Combined refrigerant outlet stream |
| 118 | Secondary hydrocarbon vapor stream |

Referring now to the drawings wherein like reference numerals designate identical or corresponding parts throughout the several views and more particularly to FIG. 1 wherein the system and method of the present invention are illustrated. A dehydrated hydrocarbon fluid mixture gas stream inlet which contains high levels of carbon dioxide flows by way of inlet gas stream 14 and enters an inlet cross heat exchanger 16 for conditioning. The resulting cooled inlet stream 18 enters a reboiler cross heater 20 for further conditioning, producing a conditioned inlet stream 22. Stream 22 may be further cooled using a chiller. If the pressure of conditioned inlet stream 22 exceeds the critical pressure, either a Joule-Thomson expander or a turbo-expander can be used to reduce the pressure of conditioned inlet stream 22. The energy from the expander can be used for compression or for generating electricity.

Upon completion of the cooling process and pressure reduction processes, the hydrocarbon fluid mixture gas stream is properly conditioned for distillation separation. A distillation separation system that produces a high yield of liquid $CO_2$ is preferred. The primary reason for selecting distillation for the bulk removal of $CO_2$ is its ability to remove the $CO_2$ as a liquid. Conditioned inlet stream 22 is distilled in distillation column 24 producing a liquefied $CO_2$ bottom product stream 26 and a distillation overhead stream 28 (containing significant amounts of $CO_2$). The distillation overhead stream 28 is combined with permeate stream 30 from the membrane unit 48 producing combined condenser inlet stream 32. This stream 32 is cooled by primary condenser 34 producing a primary condenser outlet stream 36. This stream 36 enters a primary reflux drum 38 producing a hydrocarbon vapor stream 40 and a primary reflux liquid stream 42. This liquid stream 42 flows back to distillation column 24 by gravity or is pumped by primary reflux pump 44 to enter a top tray of distillation column 24 as reflux. The hydrocarbon vapor stream 40 is sent to membrane unit 48 for further $CO_2$ removal. Hydrocarbon vapor stream 40 enters permeate cross heat exchange 5Q and is warmed prior to entering membrane unit 48. The membrane unit may be a single stage or multiple stages depending on the application, in addition, the permeate pressure of the membrane stages can be different to optimize compressing the permeate gas. Membrane separation produces a hydrocarbon product stream 52 and permeate stream 54. For this example, permeate stream 54 is compressed in a compressor 56 producing a compressed permeate stream 58. This stream 58 is divided into first and second permeate cross heat exchanger feed streams 60 and 62. These streams are cooled by permeate cross heat exchanger 50 and hydrocarbon product cross heat exchanger 66 producing permeate cross heat exchanger outlet stream 64 and hydrocarbon product cross heat exchanger outlet stream 68 that combine to form permeate stream 30.

Permeate stream 30 is then combined with distillation overhead stream 28 from the distillation column overhead to form combined condenser inlet stream 32. Permeate stream 54 could also be removed for disposal or for further processing instead of being utilized for reflux enhancement.

The $CO_2$ bottom product stream 26 may be pumped to an elevated pressure using pump 70 into stream 72. Thermal energy from the pumped $CO_2$ bottom product stream 72 is then recovered using reboiler cross heater 20 to cool inlet stream 18. The reboiler separator inlet stream 76 enters a reboiler/separator 74. The vapor from reboiler/separator 74, stream 78, is returned to the bottom of distillation column 24. The liquid from reboiler/separator 74, stream 80, is split into a primary $CO_2$ refrigerant stream 82 for chilling, with the balance, stream 84 remaining as a $CO_2$ liquid product stream. Primary $CO_2$ refrigerant stream 82 is reduced in pressure with a primary refrigerant pressure reduction device 86 producing primary condensed refrigerant inlet stream 88. This stream 88 enters primary condenser 34 providing cooling sufficient to produce the required reflux liquid stream 42. Primary condenser refrigerant outlet stream 90 leaving primary condenser 34 enters inlet cross heat exchange 16 as an economizer to cool the inlet gas. The $CO_2$ gas stream leaving inlet cross heat exchange 16 as a gas stream 92 can be compressed to combine with liquid $CO_2$ product stream 84 or can be used as a $CO_2$ gas product stream.

For a typical application with an inlet gas of 58% $CO_2$ at 610 psia, the process, as shown in FIG. 1, produces a hydrocarbon product containing 10% $CO_2$ at 565 psia and recovers 89.9% of the hydrocarbon in the inlet gas stream. The $CO_2$ gas product stream contains 92.8% $CO_2$ and recovers 89.1% of the $CO_2$ at 200 psia. The $CO_2$ liquid product stream contains 92.8% $CO_2$ and recovers 3.7% of the $CO_2$ at 610 psia. This gives a total recovery of $CO_2$ for this example of 92.8%. A significant demand for energy in any $CO_2$ removal process producing gaseous $CO_2$ is compression of the $CO_2$. $CO_2$ compression can be the limiting factor for projects requiring $CO_2$ at elevated pressures such as enhanced oil recovery, or re-injection of the $CO_2$ to eliminate venting to the atmosphere. The compression requirements for this process are less than that for traditional distillation processes, since the $CO_2$ product streams are produced at a relatively high pressure, and no external refrigeration is required.

Figure 2:
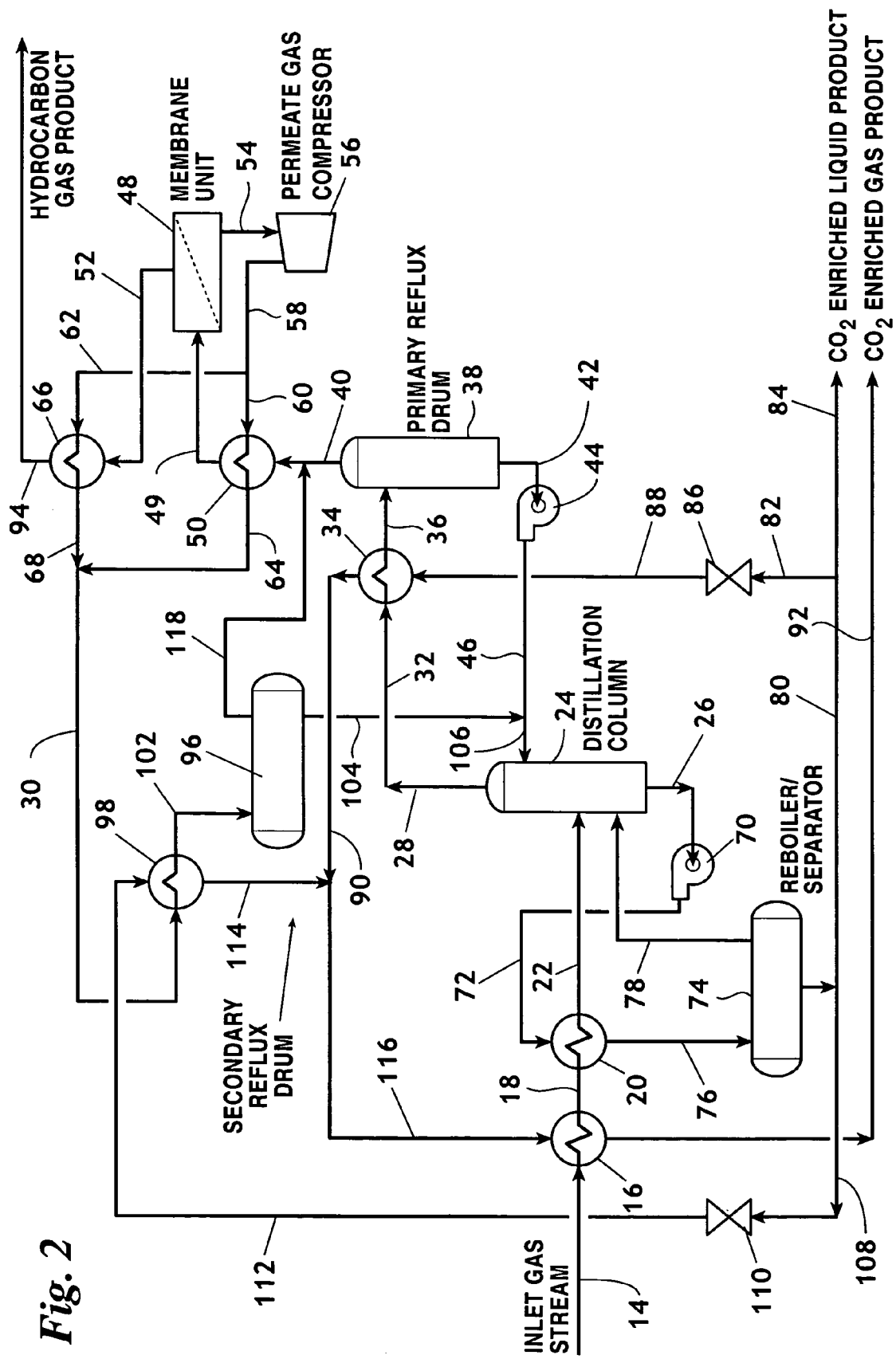
FIG. 2 represents a schematic flow diagram of the system of the present invention wherein a permeate stream from a membrane system is condensed in a separate condenser and added to the vapor from the distillation column condenser to provide feed for the membrane system.

Referring now to FIG. 2, wherein like reference numerals designate identical or corresponding parts, a dehydrated hydrocarbon fluid mixture inlet gas stream 14 that contains carbon dioxide enters inlet cross heat exchanger 16 for cooling. The resulting cooled inlet stream 18 enters a reboiler cross heater 20 for further cooling, producing conditioned inlet stream 22 which may be further cooled using a chiller. If the pressure of conditioned inlet stream 22 exceeds the critical pressure, either a Joule-Thomson expander or a turbo expander can be used to reduce the pressure thereof Energy from an expander can be used for compression of the permeate gas or for generating electricity.

Upon completion of the cooling process and pressure reduction process, the hydrocarbon fluid mixture is properly conditioned for distillation separation. A distillation separation system that produces a high yield of liquid $CO_2$ is preferred. The primary reason for selecting distillation for the bulk removal of $CO_2$ is its ability to remove the $CO_2$ as a liquid. Conditioned inlet stream 22 is then distilled in distillation column 24 producing a $CO_2$ bottom product stream 26 and a distillation overhead stream 28, which contains significant amounts of $CO_2$. The distillation overhead stream 28 is cooled by primary condenser 34 producing primary condenser outlet stream 36 that enters primary reflux drum 38 producing a hydrocarbon vapor stream 40 and a primary reflux liquid stream 42. This primary reflux liquid stream 42 is combined with secondary reflux liquid stream 104 from the secondary reflux drum 96. The combined reflux liquid stream 106 flows to a top tray of distillation column 24 as a reflux.

Hydrocarbon vapor stream 40 from primary reflux drum 38 is combined with secondary hydrocarbon vapor stream 118 and enters permeate cross heat exchanger 50 and is warmed prior to entering membrane unit 48. The membrane unit 48 may be single stage or multiple stages depending on the application. In addition, the permeate pressure of the membrane stages can be different to optimize compressing the permeate gas. Separation in membrane unit 48 produces a hydrocarbon product stream 52 and a permeate stream 54. Stream 54 is then compressed in compressor 56 producing compressed permeate stream 58 that is cooled by heat exchangers 50 and 66 producing permeate stream 30. The permeate stream 30 is then partially condensed using secondary condenser 98 producing secondary condenser outlet stream 102. Secondary reflux drum 96 produces secondary hydrocarbon vapor stream 118 and secondary reflux liquid stream 104. Vapor stream 118 is combined with vapor stream 40 from primary reflux drum 38. The combined stream is feed to membrane unit 48. Secondary reflux liquid stream 104 is combined with pumped primary reflux liquid stream from primary reflux drum 38 to provide the combined reflux liquid stream 106 that feeds onto an upper tray in distillation column 24.

The liquefied $CO_2$ bottom product stream 26 may be pumped to an elevated pressure using pump 70. Thermal energy from the pumped bottom product stream 72 is then recovered using heat exchanger 20 to cool inlet stream 18. The high concentration reboiler separator inlet stream 76 leaving heat exchanger 20 enters reboiler/separator 74. The vapor from reboiler/separator 74, stream 78 is returned to the bottom of distillation column 24. Liquid from reboiled/separator 74 is split into secondary $CO_2$ refrigerant stream 108 and reboiler separation liquid stream 80. Stream 108 is reduced in pressure with a secondary refrigerant pressure reduction device 110 providing secondary condenser refrigerant stream 112 that enters secondary condenser 98 providing cooling sufficient to produce the required reflux stream 104 that is fed to distillation column 24. The secondary refrigerant outlet stream 114 leaving secondary condenser 98 is combined with primary refrigerant outlet stream 90 and enters inlet cross heat exchange 16 as an economizer to cool the inlet gas to the process. $CO_2$ gas leaving heat exchange 16 as product 92 can be compressed to combine with liquid $CO_2$ stream 84 or retained as a $CO_2$ gas product stream.

For a typical application with an inlet gas of 58% $CO_2$ at 610 psia, the process as shown in the drawing produces a hydrocarbon gas product containing 10% $CO_2$ at 565 psia and recovers 91% of the methane in the inlet. The $CO_2$ product gas stream contains 92.8% $CO_2$ and recovers 88.2% of the $CO_2$ at 200 psia. The $CO_2$ liquid product stream contains 92.8% $CO_2$ and recovers 4.6% of the $CO_2$ at 610 psia. This gives a total recovery of $CO_2$ for this example of 92.8%. A significant demand for energy in any $CO_2$ removal process producing gaseous $CO_2$ is compression of the $CO_2$. $CO_2$ compression can be the limiting factor for projects requiring the $CO_2$ at elevated pressure such as enhanced oil recovery, or re-injection of the $CO_2$ to eliminate venting to the atmosphere. The compression requirements for this process are less than that for a traditional distillation process since the $CO_2$ product streams are produced at a relatively high pressure and no external refrigeration is required.

While the invention has been described with a certain degree of particularity, it is manifest that many changes may be made in the details of construction and the arrangement of components of the equipment and systems used in the invention, as well as the steps and sequence thereof, of practicing the methods of the invention without departing from the spirit and scope of this disclosure. It is understood that the invention is not limited to the embodiments set forth herein for purposes of exemplification, but is to be limited only by the scope of the attached claim or claims, including the full range of equivalency to which each element or step thereof is entitled.

What is claimed is:

1. A method of separating $CO_2$ from a hydrocarbon gas inlet stream that is within predetermined pressure and temperature ranges, comprising the steps of:
    (a) subjecting the inlet stream to fractional distillation providing a $CO_2$ bottom product stream and a distillation overhead stream;
    (b) passing the distillation overhead stream to the inlet of a primary reflux drum producing a primary reflux liquid stream and a hydrocarbon vapor stream;

(c) subjecting the hydrocarbon vapor stream from step (b) to membrane separation to provide a hydrocarbon product stream and a permeate stream;
(d) compressing the permeate stream from step (c) to provide a compressed permeate stream; and
(e) recycling the compressed permeate stream from step (d) to said inlet of said primary reflux drum thereby providing a primary reflux liquid stream and a hydrocarbon gas product vapor stream.

2. A method of separating $CO_2$ from a hydrocarbon gas inlet stream according to claim 1 including:
passing said $CO_2$ bottom product stream from step (a) to a reboiler separator that provides a reboiler separator vapor stream directed to a bottom portion of said distillation column and a reboiler separator liquid stream.

3. A method of separating $CO_2$ from a hydrocarbon gas inlet stream according to claim 2 wherein said $CO_2$ bottom product stream from step (a) is pumped at increased pressure to said reboiler separator.

4. A method of separating $CO_2$ from a hydrocarbon gas inlet stream according to claim 2 including the step of passing at least a portion of said reboiler separator liquid stream through a pressure reduction device to reduce the pressure thereof and adding heat thereto to provide a $CO_2$ gas product.

5. A method of separating $CO_2$ from a hydrocarbon gas inlet stream that is within predetermined pressure and temperature ranges comprising the steps of:
(a) subjecting the inlet stream to fractional distillation in a distillation column providing a $CO_2$ bottom product stream and a distillation overhead stream;
(b) subjecting said distillation overhead stream of step (a) to membrane separation, providing a hydrocarbon gas product stream and a permeate stream;
(c) compressing said permeate stream to provide a compressed permeate stream; and
(d) refluxing said compressed permeate stream from step (c) through a primary reflux drum having a primary reflux liquid stream outlet in communication with said distillation column.

6. A method of separating $CO_2$ from a hydrocarbon gas inlet stream according to claim 5, including between steps (c) and (d) the additional step of passing said compressed permeate stream through a secondary reflux drum.

7. A method of separating $CO_2$ from a hydrocarbon gas inlet stream according to claim 5 including:
subjecting at least a portion of said $CO_2$ bottom product stream from step (a) to reduced pressure to provide a $CO_2$ gas product.

8. A method of separating $CO_2$ from a hydrocarbon gas inlet stream according to claim 7 including the step of:
passing a portion of said $CO_2$ bottom product stream through a pressure reduction device through at least one heat exchanger used to adjust the temperature range of said hydrocarbon inlet stream.

9. A method of separating $CO_2$ from a hydrocarbon gas inlet stream that is within predetermined pressure and temperature ranges, including the steps of:
(a) subjecting the inlet stream to a distillation column producing a bottom product stream and a distillation overhead stream;
(b) condensing said distillation overhead stream of step (a) in a primary reflux drum producing a primary reflux liquid stream and a hydrocarbon vapor stream;
(c) recycling said primary reflux liquid stream of step (b) to said distillation column as a reflux stream;
(d) separating said concentrated hydrocarbon vapor stream from step (b) by membrane separation into a hydrocarbon gas product stream and a permeate stream;
(e) compressing said permeate gas stream from step (d) to produce a compressed permeate stream;
(f) condensing said compressed permeate stream of step (e) to produce a primary reflux liquid stream that is conveyed to an upper portion of said distillation column;
(g) pumping said bottom product stream from step (a) to provide an elevated pressure liquid $CO_2$ product; and
(h) subjecting said bottom product stream of step (a) to a reboiler separator to produce a $CO_2$ liquid product and a reboiler separator vapor stream that is recycled to a bottom portion of said distillation column.

10. A system for separating $CO_2$ from a hydrocarbon gas inlet stream that is within predetermined pressure and temperature ranges, comprising:
a distillation column receiving the hydrocarbon gas inlet stream and providing a $CO_2$ bottom product stream and a distillation overhead stream;
a primary reflux drum having an inlet receiving the distillation overhead stream and producing a primary reflux liquid stream and a hydrocarbon vapor stream;
a membrane unit receiving the hydrocarbon vapor stream from said primary reflux drum to provide a hydrocarbon gas product stream and a permeate stream;
a compressor receiving said permeate stream from said membrane unit to provide a compressed permeate stream; and
piping to recycle said compressed permeate stream to said inlet of said primary reflux drum thereby providing a liquefied $CO_2$ product and a hydrocarbon gas product.

11. A system of separating $CO_2$ from a hydrocarbon gas inlet stream according to claim 10 including:
a reboiler separator having an inlet that receives said $CO_2$ bottom product stream from said distillation column and that provides a reboiler separator vapor stream to a bottom portion of said distillation column and a $CO_2$ liquid product.

12. A system for separating $CO_2$ from a hydrocarbon gas inlet stream according to claim 10 including;
a $CO_2$ bottom product pump in line with said $CO_2$ bottom product stream to increase the pressure within said reboiler separator.

13. A system of separating $CO_2$ from a hydrocarbon gas inlet stream according to claim 10 including a primary refrigerant pressure reduction device through which at least a portion of said $CO_2$ liquid product from said reboiler separator is passed to reduce the pressure thereof and add heat thereto to provide a $CO_2$ gas product.

14. A system for separating $CO_2$ from a hydrocarbon gas inlet stream that is within prescribed pressure and temperature ranges comprising:
a distillation column for receiving and fractionally distilling the hydrocarbon gas inlet stream providing a $CO_2$ liquid product and a distillation overhead stream;
a membrane unit receiving the distillation overhead stream and providing a hydrocarbon gas product and a permeate stream;
a compressor receiving the permeate stream and providing a compressed permeate stream; and
a primary reflux drum receiving said compressed permeate stream providing a primary reflux liquid stream that is refluxed back into said distillation column.

15. A system for separating $CO_2$ from a hydrocarbon stream according to claim 14 including a secondary reflux drum that receives said compressed permeate stream and that provides a secondary reflux liquid stream that is refluxed to said distillation column.

16. A system for separating $CO_2$ from a hydrocarbon stream according to claim 14 including a primary refrigerant pressure reduction device through which at least a portion of said $CO_2$ bottom product stream is passed to reduce the pressure thereof to provide a $CO_2$ gas product.

17. A system for separating $CO_2$ from a hydrocarbon inlet stream according to claim 16 including an inlet cross heat exchanger through which said $CO_2$ gas product from said refrigerant pressure reduction device passes and through which the hydrocarbon inlet stream passes to thereby serve to adjust the temperature range of the hydrocarbon inlet stream.

* * * * *